United States Patent [19]

Roha

[11] Patent Number: 4,950,710
[45] Date of Patent: Aug. 21, 1990

[54] FILLED POLYMERIC COMPOSITE CONTAINING A REACTIVE ALUMINUM COMPOUND

[75] Inventor: Max E. Roha, Brecksville, Ohio

[73] Assignee: Aluminum Company of America, Pittsburgh, Pa.

[21] Appl. No.: 153,763

[22] Filed: Feb. 8, 1988

[51] Int. Cl.$^5$ ............................ C08K 3/36; C08K 3/34; C08K 3/22; C08K 7/14
[52] U.S. Cl. .................... 524/786; 524/787; 524/789; 524/790; 524/791; 524/850; 524/851; 524/853; 524/854
[58] Field of Search ............... 524/560, 853, 854, 786, 524/789, 791, 787, 437, 449, 451, 456, 424, , 447, 787, 790, 850, 851

[56] References Cited

U.S. PATENT DOCUMENTS

| | | | |
|---|---|---|---|
| 2,744,074 | 5/1956 | Theobald | 260/2 |
| 3,326,716 | 6/1967 | Hurley et al. | 117/126 |
| 4,049,748 | 9/1977 | Bailey | 526/224 |
| 4,242,243 | 12/1980 | Antonelli et al. | 523/459 |

Primary Examiner—Lewis T. Jacobs
Attorney, Agent, or Firm—Glenn E. Klepac

[57] ABSTRACT

A composite comprising the reaction product of a filler having a reactive hydroxylated surface, a monomer or polymer containing carboxyl groups, and an organoaluminum compound, the organoaluminum compound being reacted with said hydroxylated surface and with said monomer or polymer. A preferred composite is made by reacting aluminum sec-butoxide with fiberglass and acrylic acid and methyl methacrylate under polymerization conditions.

20 Claims, No Drawings

FILLED POLYMERIC COMPOSITE CONTAINING A REACTIVE ALUMINUM COMPOUND

TECHNICAL FIELD

This invention is related to filled polymeric composites of improved strength. The composites are useful for structural members.

BACKGROUND OF THE INVENTION

Theobald U.S. Pat. No. 2,744,074 describes the preparation of organic polymeric aluminum compounds by the condensation polymerization of an anhydrous carboxylic acid and an aluminum alkoxide The resulting compounds are said to be useful as dispersing agents for pigments and as cross-linking agents for polymers.

Hurley U.S. Pat. No. 3,326,716 describes the coating of glass fibers in an aqueous medium with a coupling agent comprising a water-soluble carboxyl substituted phenol and a water-soluble polyvalent metal salt. Some suitable metal salts are aluminum chloride, aluminum bromide, aluminum iodide, aluminum sulphate, and aluminum nitrate. The aqueous medium is rendered acidic by addition of acids that are not polymerizable under the reaction conditions utilized. The coated glass fibers are later combined with a thermosetting resin such as an epoxy or an unsaturated polyester.

DISCLOSURE OF INVENTION

In accordance with the invention, tensile modulus and stress are improved by the formation of a composite comprising a filler having a reactive hydroxylated surface, a monomer or polymer containing carboxyl groups, and an aluminum compound. The aluminum compound is reactive with both the hydroxylated surface of the filler and the monomer or polymer. The polymer may be formed in the reaction mixture, preferably by free radical polymerization, or added preformed preferably to the extrusion or other processing equipment. The reaction is conducted in a substantially anhydrous medium and depending upon the reactants, may also be conducted in the substantial absence of air (e.g., nitrogen inert atmosphere).

The filler includes fibers, particles, flakes and whiskers and may be inorganic or organic. Exemplary of suitable organic fillers having hydroxylated surfaces are cotton, wool, paper, starch, wood pulp, wood flour, wood fiber, and rayon. Some suitable inorganic fillers are fiberglass, alumina hydrate, bauxite, mica, talc, hydrated calcium silicate, hydrotalcite, kaolin, and silica. What is meant by a hydroxylated surface is that the surface of the substrate filler has hydroxyl group bonded to it.

The most commonly used free radical polymers are formed from monomers having an alkenyl group such as styrene, vinyl acetate, vinyl chloride, acrylic acid, acrylonitrile, acrylamide, alpha methylstyrene, vinylidene chloride, methyl methacrylate and methacrylic acid.

The above monomers and many others can be polymerized in the reaction mixture. For example, a composite composed of poly(methyl methacrylate) matrix can be formed in the reaction mixture from methyl methacrylate and acrylic acid. Only about 1 mole % of the acid is required to provide the carboxyl groups. Similarly, polystyrene can be formed in situ from styrene monomer and 1-2 mole % of methacrylic acid. Poly(vinyl chloride) can be formed from vinyl chloride and 1-2 mole % of acrylic acid. Poly(ethyl acrylate) can be formed from ethyl acrylate and acrylic acid.

Butyl acrylate and ethyl acrylate copolymer, octyl acrylate and vinyl chloride copolymer, styrene and divinyl benzene copol acrylonitrile copolymer, and polyvinyl acetate can be formed in similar fashion. If desired, a polyfunctional acid can be employed such as trimellitic acid. Other suitable acids include: crotonic, isocrotonic, beta-ethylacrylic, isohydroascorbic, hydrosorbic, trans-2-heptenoic, 2'-octenoic, 2-nonenoic, angelic, and tiglic. The preferred acids, which are mentioned herein, are characterized by having an unsaturated bond that can polymerize.

Condensation polymers may also be employed. For example, nylon polymers can be produced in which a small amount of excess adipic acid is not completely neutralized during the preparation to provide the desired functionality. Further, poly(ethylene terephthalate) can be formed from ethylene glycol and 2 mole % excess terephthalic acid and poly(butylene terephthalate) can be prepared from butylene glycol and 2 mole % excess terephthalic acid. Other suitable polymers include vinyl ketone polymers, polyphosphates, polysiloxanes, polysulfides, polysulfones, polytetrafluoroethylene, polyurethanes, and mixtures thereof. Inasmuch as only a small amount of carboxyl groups is required, any of a large number of polymers and acids can be employed.

Aluminum compounds that will react with hydroxylated surfaces are also abundant. For example, the compound may be substituted with alkyl, alkoxy, esters, aromatics, organohalides such as organochlorides and mixtures wherein each hydrocarbon substituent has up to about 18 carbon atoms. Typical examples are:
aluminum tris sec-butoxide,
aluminum methoxide,
aluminum ethoxide,
aluminum pentoxide,
aluminum hexoxide,
aluminum heptoxide,
aluminum dodecoxide,
triethyl aluminum,
triisobutyl aluminum,
trimethyl aluminum,
triisopropyl aluminum,
triodedecyl aluminum,
dibutyl methyl aluminum,
diethyl n-butyl aluminum,
aluminum benzoate,
diethyl aluminum chloride, and
aluminum acetate.

The free radical reactions may be initiated by ultraviolet light or by conventional free radical catalysts. Typical catalysts include:
benzoyl peroxide,
acetyl peroxide,
di-t-butyl peroxide,
dicumyl peroxide,
2,2'-azabisisobutyronitrile,
2,2'-azobis-2-methylbutyronitrile, and
2,2'-azobis (methyl isobutyrate).

The proportions of ingredients will depend upon the materials employed but generally sufficient acid is employed to provide from about 0.25 to 2.5 moles of carboxyl groups in the polymer for each mole of aluminum compound when the polymer is prepared in the reaction mixture. A preferred ratio is from about 0.8 to 1.5, and a most preferred ratio is from about 0.9 to 1.2 per mole of aluminum compound. Preformed polymers may require from about 0.25 to 25 moles or more of carboxyl groups per mole of aluminum compound as the effectiveness of the carboxyls may be less. The filler can be employed at between about 10% and about 70% by weight for most uses preferably between about 10% and about 50% and more preferably from about 20% to about 50%. Higher loadings may be desirable in some cases and generally provide increased strength to the composite.

The reaction should be conducted under substantially anhydrous conditions and when free radical polymerization is employed, the reaction should be conducted in the substantial absence of air (e.g., nitrogen inert atmosphere). Depending on which reactants are employed, solvents may not be required. If used, the solvent would preferably be removed before use of the composite. Suitable solvents include benzene, toluene, xylene, cyclohexane, and the like.

The following Example will serve to illustrate the invention. All parts and percentages are by weight, unless otherwise indicated, as in the rest of the specification and claims.

EXAMPLE

A slurry was formed of 25 g fiberglass (pre-dried at 150° C. for four days) in 120 g (1.2 mole) distilled methyl methacrylate monomer. To this slurry was added with stirring 11 g (4.49 mmole) of 10% aluminum tris secondary butoxide (ASB) in methyl methacrylate. Then 3.3 g (4.27 mmole) of 10% acrylic acid in methyl methacrylate was added to the slurry. Finally, 6.6 g (.20 mmole) of a solution of azoisobutyrylnitrile (AIBN) in methyl methacrylate was added to the slurry. The ingredients were added in a solution of methyl methacrylate to facilitate mixing.

The slurry was deaerated with nitrogen and degassed under reduced pressure. Then the reaction mixture was heated at 60-70° C. for two hours at which time it became very viscous. The mixture was poured into a mold and heated in an oven at 65° C. for two days and subsequently at 150° C. for two more days. The sample was then allowed to cool to room temperature, removed from the mold, cut to specific test dimensions, and tested by ASTM D-790. The results are reported in the following Table with additional examples at varying percentages of fiber (coated and uncoated) and compared to compositions without the aluminum compound. The uncoated fiber was 1/16 inch (.16 cm) milled fiberglass, and the coated fiber was a commercially obtained material designated 731ED from Owens-Corning Fiberglas Corporation.

TABLE

| | Density g/cc | Stress at Break MPa | Modulus MPa | Strain at Break % | No. of Samples |
| --- | --- | --- | --- | --- | --- |
| Prior Art Compositions (No ASB) | | | | | |
| 10% uncoated fiber | 1.24 | 96.8 | 3218 | 5.17 | 2 |
| 50% uncoated fiber | 1.56 | 77.7 | 7512 | 1.20 | 4 |
| 15% coated fiber | 1.26 | 101.8 | 3913 | 3.80 | 7 |
| 40% coated fiber | 1.47 | 108.5 | 7404 | 1.73 | 3 |
| Aluminum Compound Compositions (With ASB) | | | | | |
| 10% uncoated fiber | 1.31 | 100.2 | 3968 | 3.08 | 3 |
| 50% uncoated fiber | 1.71 | 91.8 | 10033 | 1.01 | 4 |
| 15% coated fiber | 1.28 | 108.0 | 4675 | 2.75 | 4 |
| 40% coated fiber | 1.52 | 122.9 | 8792 | 1.7 | 2 |

From the data reported in the Table, it can be seen that addition of the aluminum sec-butoxide produces composites with increased modulus and increased stress at break.

The invention is illustrated by specific embodiments, but similar results would be expected for the other materials disclosed herein and thus the invention is intended to be limited only by the appended claims.

What is claimed is:

1. A reinforced composite material comprising:
   (a) about 10-70 wt% of a filler having a hydroxylated surface; and
   (b) about 30-90 wt% of a matrix material comprising:
      (1) a copolymer comprising:
         (a) a first monomer containing an alkenyl group, said first monomer being selected from the group consisting of styrene, vinyl acetate, vinyl chloride, acrylonitrile, acrylamide, alpha-methylstyrene, vinylidene chloride, methyl methacrylate, ethyl acrylate, butyl acrylate, and divinyl benzene; and
         (b) a second monomer containing an alkenyl group and a carboxyl group, said second monomer being selected from the group consisting of acrylic acid, methacrylic acid, trimellitic acid, crotonic acid, trimellitic acid, crotonic acid, isocrotonic acid, beta-ethylacrylic acid, isohydroascorbic acid, hydrosorbic acid, trans-2-heptenoic acid, 2'-octenoic acid, 2-nonenoic acid, angelic acid, and tiglic acid; and
      (2) an organoaluminum compound.

2. The composite material of claim 1 wherein said organoaluminum compound is reacted with said hydroxylated surface and with said copolymer.

3. The composite material of claim 2 wherein the organoaluminum compound is reacted with said hydroxylated surface and with said copolymer.

4. The composite material of claim 1 wherein the molar ratio of carboxyl groups in the copolymer to the organoaluminum compound is about 0.25-25:1.

5. The composite material of claim 1 wherein the organoaluminum compound comprises aluminum substituted with an alkoxy group or an alkyl group.

6. The composite material of claim 1 wherein the organoaluminum compound comprises aluminum butoxide.

7. The composite material of claim 1 wherein the filler comprises about 20-50 wt% and the matrix material comprises about 50-80 wt% of the solid composite.

8. The composite material of claim 1 wherein the filler comprises an inorganic filler selected from the group consisting of fiberglass, alumina hydrate, bauxite, mica, talc, hydrated calcium silicate, hydrotalcite, kaolin, and silica.

9. The composite material of claim 1 wherein said inorganic filler comprises fiberglass.

10. A method of preparing a reinforced composite material comprising:
  (a) forming a substantially anhydrous reaction mixture comprising:
    (1) a filler having a hydroxylated surface; and
    (2) a mixture comprising:
      (a) a first monomer containing an alkenyl group, said first monomer being selected from the group consisting of styrene, vinyl acetate, vinyl chloride, acrylonitrile, acrylamide, alpha-methylstyrene, vinylidene chloride, methyl methacrylate, ethyl acrylate, butyl acrylate, and divinyl benzene; and
      (b) a second monomer containing an alkenyl group and a carboxy group, said second monomer being selected from the group consisting of acrylic acid, methacrylic acid, trimellitic acid, crotonic acid, isocrotonic acid, beta-ethylacrylic acid, isohydroascorbic acid, hydrosorbic acid, trans-2-heptenoic acid, 2'-octenoic acid, 2-nonenoic acid, angelic acid, and tiglic acid; and
      (c) an organoaluminum compound; and
  (b) reacting said organoaluminum compound with said filler and copolymerizing said first and second monomers to form a reinforced composite.

11. The method of claim 10 wherein the filler comprises an inorganic filler selected from the group consisting of fiberglass, alumina hydrate, bauxite, mica, talc, hydrated calcium silicate, hydrotalcite, kaolin, and silica.

12. The method of claim 11 wherein the inorganic filler comprises fiberglass.

13. The method of claim 10 wherein said first and second monomers are copolymerized by free radical polymerization.

14. The method of claim 10 wherein step (b) is conducted in a substantially inert atmosphere.

15. The method of claim 11 wherein the inorganic filler comprises about 10–70 wt% and the matrix material comprises about 30–90 wt% of the reaction mixture.

16. The method of claim 11 wherein the inorganic filler comprises about 20–50 wt%, and the matrix material comprises about 50–80 wt% of the reaction mixture.

17. The method of claim 10 wherein said reaction mixture further comprises a non-aqueous solvent.

18. The method of claim 10 wherein said first monomer comprises methyl methacrylate and said second monomer comprises acrylic acid.

19. The method of claim 10 wherein said organoaluminum compound comprises aluminum substituted with an alkoxy group or an alkyl group.

20. A reinforced solid composite material comprising the reaction product of:
  (a) about 10–70 wt% fiberglass; and
  (b) about 30–90 wt% of a matrix material comprising:
    (1) a first monomer containing an alkenyl group, said first monomer being selected from the group consisting of methyl methacrylate and ethyl acrylate;
    (2) a second monomer selected from the group consisting of acrylic acid and methacrylic acid; and
    (3) an organoaluminum compound comprising aluminum substituted with an alkoxy group or an alkyl group.

* * * * *

UNITED STATES PATENT AND TRADEMARK OFFICE
CERTIFICATE OF CORRECTION

PATENT NO. : 4,950,710

DATED : August 21, 1990

INVENTOR(S) : Max E. Roha

It is certified that error appears in the above-identified patent and that said Letters Patent is hereby corrected as shown below:

| | |
|---|---|
| Col. 1, line 52 | Change "group" to --groups--. |
| Col. 2, line 5 | After "benzene" delete "copol" and insert --copolymer, styrene--. |
| Claim 3, Col. 4, lines 50-51 | After "with" delete "said hydroxylated surface and with said copolymer" and insert --the copolymer and the filler in a substantially anhydrous medium--. |
| Claim 10, Col. 5, line 19 | Change "carboxy" to --carboxyl--. |

Signed and Sealed this

Twenty-ninth Day of October, 1991

Attest:

HARRY F. MANBECK, JR.

*Attesting Officer*  *Commissioner of Patents and Trademarks*